INVENTOR.
RUSSELL A. HEMSTREET
BY *John C. [signature]*
ATTORNEY

Jan. 10, 1967   R. A. HEMSTREET   3,296,773
ADSORBENT-COATED THERMAL PANELS

Filed March 24, 1964   4 Sheets-Sheet 2

INVENTOR.
RUSSELL A. HEMSTREET
BY
John C. Towner
ATTORNEY

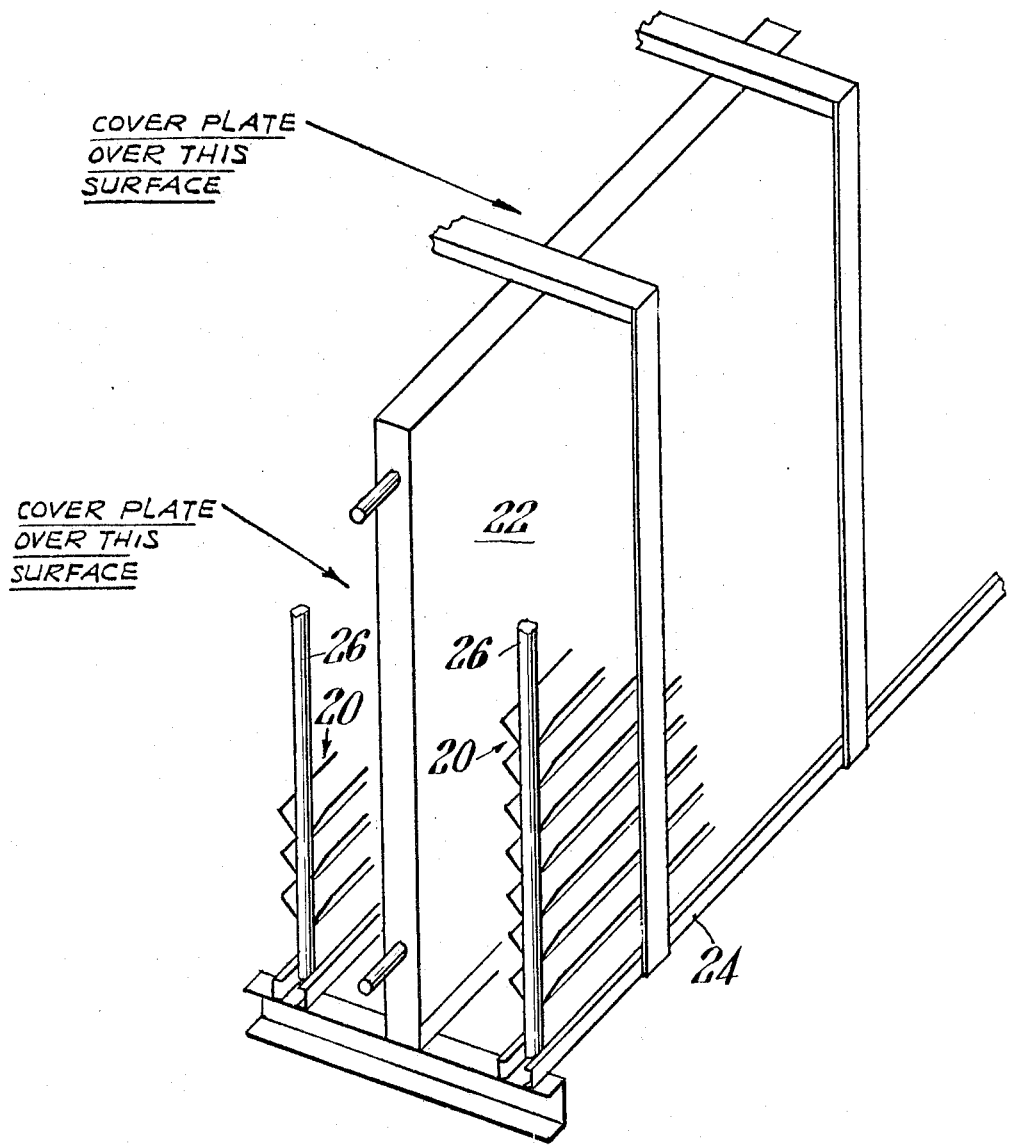

United States Patent Office 3,296,773
Patented Jan. 10, 1967

3,296,773
ADSORBENT-COATED THERMAL PANELS
Russell A. Hemstreet, Kenmore, N.Y., assignor to Union
Carbide Corporation, a corporation of New York
Filed Mar. 24, 1964, Ser. No. 354,290
5 Claims. (Cl. 55—27)

This application is a continuation-in-part of application Serial No. 322,690, filed November 12, 1963.

This invention relates to panels coated with gas adsorbents in thermal contact therewith. This invention also relates to cryosorption systems employing such panels.

The production and maintenance of extremely high vacuums in chambers (e.g., in space simulation chambers) are becoming an increasingly important technological area. One typical means presently employed to produce extremely high vacuums in chambers is the use of an oil or mercury diffusion pump, and another typical means is the use of a trap containing a cryogenic liquid-cooled gas adsorbent. Such diffusion pumps and traps are in gaseous communication with the chamber via a conduit, and the performance of these pumps and traps is limited by the diameters of the conduits, particularly where the vacuum is so low that the gas molecules in the chamber are in free molecular flow. Under the latter conditions, practical diffusion pumps and known adsorbent traps are often scarcely able to maintain a given vacuum owing to the degassing of the metals in the system and further increase in vacuum cannot be achieved. Moreover, diffusion pumps of the oil variety have the disadvantage that the oil tends to migrate into the chamber unless precautions are taken, while diffusion pumps of the mercury variety have relatively low pumping speeds.

It is an object of this invention to provide a system for rapidly adsorbing gases. It is a further object to provide a system for rapidly pumping gases that are in free molecular flow to very low pressures.

Further objects of this invention will be apparent from the following description of this invention.

FIGURE 2 depicts a coated panel of this invention.

Figure 6:
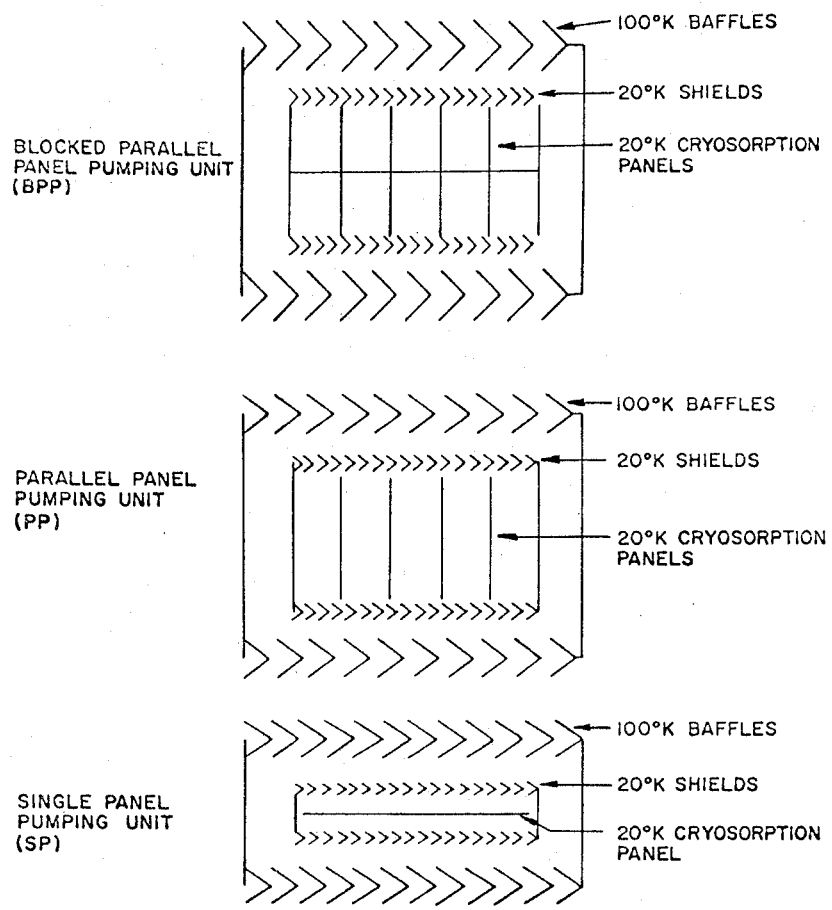

FIGURE 6 schematically depicts three exemplary pumping units which can be employed in this invention.

Figure 8:
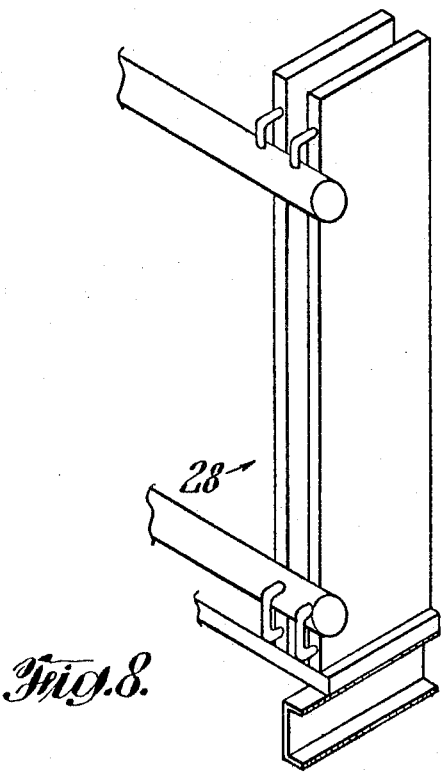

FIGURES 7 and 8 are partial perspective views of cryosorption units of this invention.

This invention provides a coated panel which comprises a non-porous panel wall coated with a thin layer of a gas adsorbent. The panel wall is adapted for rapid heating and cooling and is covered, on at least one surface, with a thin layer of a gas adsorbent. The gas adsorbent is bonded in good thermal and structural contact with said wall, so as to rapidly attain about the same temperature as the panel wall.

In general, any gas adsorbent can be employed as a coating on the coated panels of this invention. Thus, the adsorbent can be a material such as charcoal (preferably coconut charcoal) or silica gel. However, it is preferred that the adsorbent be a crystalline zeolitic molecular sieve. Suitable zeolitic molecular sieves include both the naturally-occurring zeolitic molecular sieves and the synthetic zeolitic molecular sieves. Among the naturally-occurring zeolitic molecular sieves are chabazite, erionite, mordenite, and faujasite, these being adequately described in the chemical art. Synthetic zeolitic molecular sieves include zeolites A, D, L, R, S, T, X, and Y, as well as the mordenite-type material known commercially as Zeolon and described in Chemical and Engineering News, March 12, 1956, pages 52–54.

The pore size of the zeolitic molecular sieves may be varied by employing different metal cations. For example, sodium zeolite A has a pore size of about 4 Angstrom units whereas when calcium cations have been exchanged for at least about 40 percent of the sodium cations calcium zeolite A has a pore size of about 5 Angstrom units.

Zeolite A is a crystalline zeolitic molecular sieve which may be represented by the formula:

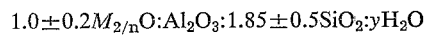

$$1.0 \pm 0.2 M_{2/n}O : Al_2O_3 : 1.85 \pm 0.5 SiO_2 : yH_2O$$

wherein M represents a metal, $n$ is the valence of M, and $y$ may have any value up to about 6. The as-synthesized zeolite A contains primarily sodium ions and is designated sodium zeolite A, described in more detail in U.S. Patent No. 2,882,243, issued April 14, 1959.

Zeolite X is a synthetic crystalline zeolitic molecular sieve which may be represented by the formula:

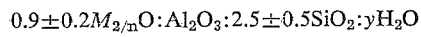

$$0.9 \pm 0.2 M_{2/n}O : Al_2O_3 : 2.5 \pm 0.5 SiO_2 : yH_2O$$

wherein M represents a metal, particularly alkali and alkaline earth metals, $n$ is a valence of M, and $y$ may have any value up to about 8, depending on the identity of M and the degree of hydration of the crystalline zeolite. Sodium zeolite X has an apparent pore size of about 10 Angstrom units. Zeolite X, its X-ray diffraction pattern, its properties, and methods for its preparation are described in detail in U.S. Patent No. 2,882,244, issued April 14, 1959.

Zeolite Y is described and claimed in U.S. patent application Serial No. 109,487, filed May 12, 1961, in the name of D. W. Breck.

Agglomerates comprising adsorbents, such as zeolitic molecular sieves, and finely divided metal particles can also be employed as the adsorbent in the coated panels of this invention. More specifically, such agglomerates preferably may comprise zeolitic molecular sieve crystals of less than 10 microns individual size and metal bodies having at least one dimension less than 50 microns, the ratio of the metal body size to the zeolitic molecular sieve crystal size being at least 5 to 1. The metal bodies are uniformly dispersed throughout the agglomerate in quantity sufficient to constitute between about 5 and 30 percent by weight of the agglomerate, and may be sintered to the outer surface of the molecular sieve crystals. If sintered, the metal should have a melting point over 300° C. and be employed primarily as a structural component in the multi-crystalline agglomerate but probably also enters into the formation of a chemical bond with the molecular sieve crystals by virtue of the sintering. Among the metals suitable for use in the multi-crystalline agglomerate are those of groups Ib, IIb, IIIa, IIIb, Va, Vb, VIb, VIIb, and VII of the Periodic Table (Handbook of Chemistry and Physics, Thirty-Eighth Edition, page 394, Chemical Rubber Publishing Co. 1956). Silicon, germanium, lead, and tellurium are also suitable. Exemplary metals include, but are not limited to, copper, silver, and gold of group Ib, magnesium of group IIa, zinc of group IIb, boron and aluminum of group IIIa, yttrium of group IIIb, antimony of group Va, vanadium of group Vb, chromium of group VIb, manganese of group VIIb, and iron, nickel, platinum, and palladium of group VIII. Mixtures and alloys of these metals may also be employed. Such agglomerates are disclosed and claimed in U.S. patent application Serial No. 300,163, now Patent No. 3,181,231, filed August 6, 1963.

The thickness of the coating of adsorbent on the coated panels of this invention is not narrowly critical, and can be varied as desired to meet the particular requirements of any area of application. In general, it has been found that adsorbent coatings having a thickness from 0.01 to 0.25 inch are particularly satisfactory.

The adsorbent coating can be bonded to the panel wall in the coated panels of this invention by any suitable means. In general, it is preferred to bond the coating to the wall by a procedure which involves cleaning the panel wall, roughening the panel wall, and then applying to the panel wall a mixture of the adsorbent and an inorganic binder. The cleaning step can be accomplished employing steam, pickling solutions, organic solvents, aqueous solvents, and the like alone or in various combinations, depending upon the initial condition of the panel wall and depending upon the particular material that comprises the panel wall. The roughening step can be accomplished in any of a variety of ways, including grit blasting, or milling the panel walls, or attaching a screen to the panel wall. All of these methods provide raised metal portions on the panel wall which serve to lock the subsequently applied adsorbent to the panel wall. When a screen is used, it can be suitably fastened to the panel wall by first covering the panel wall with thin sheets of a brazing alloy, placing a metallic screen—preferably of relatively fine mesh—over the sheets of brazing alloy, heating the assembly to a temperature at which the brazing alloy melts, and then cooling the assembly. The brazing alloy then serves as a bonding agent between the panel wall and the screen. Alternately, the screen can be welded or soldered to the panel wall.

Suitable inorganic binders which can be employed to bond the adsorbent to the roughened panel wall include finely divided attapulgite, kaolin, sepiolite, polygarskite, kaolinite, plastic ball clays, clays of the attapulgite or kaoline types, bentonite, montmorillonite, illite, chlorite, and bentonite-type clay. Such binders are pre-mixed with the adsorbent, which is also preferably finely divided, and then applied to the roughened panel wall, preferably in the form of a slurry whose concentration can be varied to suit the thickness of the coating desired. It is preferred that the adsorbent coating be substantially free of any organic binder, e.g., epoxy resin binders. Such organic binders may impair the adsorbent properties of the adsorbent.

After the adsorbent-binder mixture has been applied to the surface of the panel wall, it is desirable to heat the adsorbent to temperatures sufficiently elevated to cause the binder to set or cure so as to effectively bond the adsorbent to the panel wall. The temperature will be dependent upon the particular binder and adsorbent employed, but generally temperatures from 500° to 650° C. are suitable, particularly where the adsorbent is a crystalline zeolitic molecular sieve. In the latter case, the heating also serves to liberate water adsorbed by the zeolitic molecular sieve. The heating to set the adsorbent-binder mixture is preferably done in an atmosphere of an inert gas such as nitrogen or argon.

The coated panels of this invention can be used in any of a number of applications. They are especially adapted for use in pumping systems employed to produce vacuums as low as $10^{-10}$ torr. In such applications they are conviently employed in conjunction with conventional pumping means. By way of illustration, the coated panels can be employed along with mechanical pumps, diffusion pumps, and cryogenic condensation pumps to achieve such vacuums. In such areas the mechanical pumps can be used to lower the pressure to $10^{-3}$ torr, then the diffusion pumps can be used to lower the pressure further—to $10^{-6}$ to $10^{-7}$ torr—and the combination of the cryogenic condensation pumps and the coated panels of this invention can be employed to still further reduce the pressure to $10^{-10}$ torr. In such systems it is preferred that the adsorbent on the coated panels of this invention is a zeolitic molecular sieve bonded to the panel wall with one of the above-described inorganic binders.

It will be apparent that the coated panels of this invention are generally useful in the same areas as are the adsorbents themselves (e.g., in selectively separating gases, in retaining catalysts, and the like).

The non-porous (i.e., gas-impermeable) nature of the panels of this invention makes them suitable for use as the outer walls in vacuum enclosures. In such cases the coated surface of the panel is oriented toward the inside of the enclosure so as to aid in producing or maintaining the vacuum.

The gases which can be adsorbed by the coating panels of this invention include oxygen, nitrogen, hydrogen, helium, argon, vaporized organic liquids, carbon dioxide, water, etc.

The adsorption process is exothermic and inefficient use of refrigeration would limit the pumping speed of the system because the heat of adsorption could not be withdrawn quickly enough to prevent a temperature rise and a decrease in adsorption rate. Therefore, the practical application of cryosorption pumping requires that the adsorbent be bonded to or be in intimate thermal contact with a refrigerated surface. It would be possible to hold loose adsorbent pellets against a refrigerated surface by means of a retaining screen but this would become awkward if large adsorbent surface areas were designed. The thermal contact between the pellets and refrigerated surface would be poor. Also, it would be difficult to control the packing of pellets against a refrigerated surface and it would be impossible to prepare cryosorption panels with reproducible surface areas.

In order for an adsorbent to be useful for cryosorption pumping it must have both a high equilibrium capacity for the gas that is to be pumped and a high pumping speed (adsorption rate). These properties are not necessarily related. On the basis of equilibrium data on hydrogen adsorption, cocoanut charcoal, molecular sieves 5A, 10X, 13X, 4A, and several special molecular sieves interspersed with fine metal flake (such as aluminum and the coinage metals) were examined as possible gaseous cryosorption materials. The pump speeds of these adsorbents were compared by measuring the residual gaseous pressure over the adsorbent bed during continuous admission of a selected gas. All of the above-mentioned materials were satisfactory, the molecular sieve material, particularly the type containing aluminum flake, being the best for the following reasons. Molecular sieves are well defined crystalline materials and their properties do not depend on their source and there are no batch to batch variations in properties. Furthermore, molecular sieves are found to be most conveniently bonded in good thermal contact with the refrigerated surface. Molecular sieves containing metal flake were also found to have greater thermal conductivity characteristics and would therefore assume a temperature much closer to the temperature of the refrigerated surface. This latter feature of aluminum and molecular sieve mixtures is particularly desirable where the molecular sieve is not shielded from thermal radiation.

Several techniques of bonding adsorbent materials to refrigerated surfaces have been developed. One such technique is to coat the refrigerated surface with a thin layer of epoxy resin, sprinkle the adsorbent material on the coated surface and then cure the resin so that the adsorbent is rigidly bonded. Another technique is to coat the adsorbent material with sodium silicate and press the impregnated adsorbent mass against the refrigerated surface and then dry the material to create the bond. A third technique which is particularly applicable when molecular sieves are used as the adsorbent material is to form a direct bond between the molecular sieve and the refrigerated surface without the use of any adhesives not normally found in commercially available molecular sieve compositions. This latter technique is particularly desirable over epoxy or silicate bonding because there is no likelihood of the bonding material diffusing into the adsorbent and partially sealing the adsorbent surface against gas adsorption.

In order to bond the molecular sieve directly to the refrigerated surface without using adhesives not found in commercially available molecular sieve compositions it has been found to be necessary to employ a roughened refrigerated surface. Several types of roughened refrigerated surfaces have been found suitable. One type of surface consists of a metallic screen. A second consists of a metallic plate that has been cross-milled to provide closely spaced protrusions which extend outward from the cross-milled grooves. A third type is a metallic surface provided with rows of fins which are closely spaced. A fourth type of surface is provided by abrading a metal surface with shot or the like to raise spines or whiskers on the metal to which the adsorbent can adhere. These roughened surfaces, of course, are also suitable if a bonding material such as an epoxy or a silicate is employed and are also suitable for use with adsorbent materials other than molecular sieves. These roughened surfaces are all similar in that they provide a "lath effect" which permits locking the adsorbent material thermally and structurally to the refrigerated surface. Thus, for the purpose of this invention, "roughened refrigerated surface" is a non-smooth surface which will provide a "lath effect."

Figure 1:
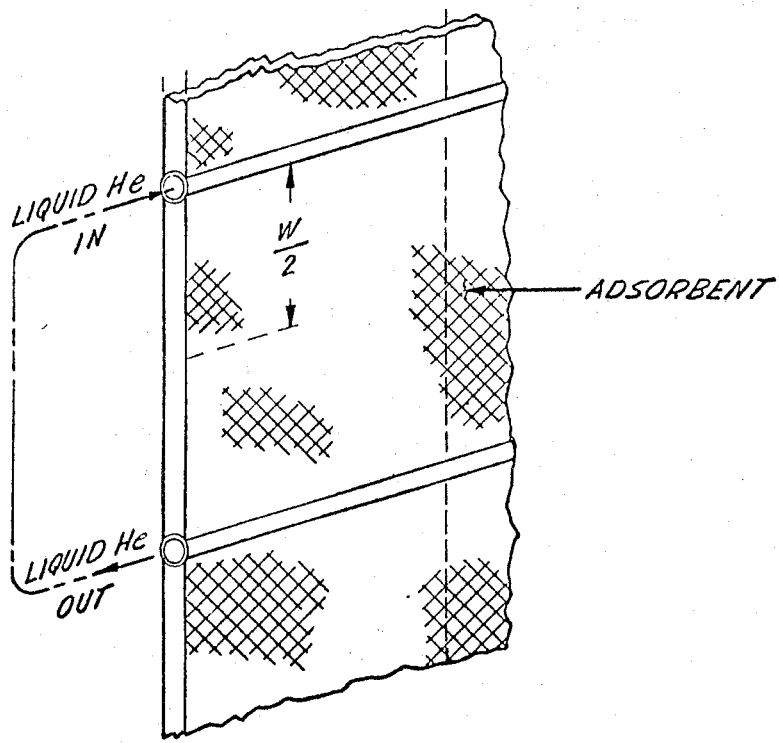
FIGURE 1 is a perspective view of a panel which can be employed in producing a coated panel of this invention.
Figure 2:
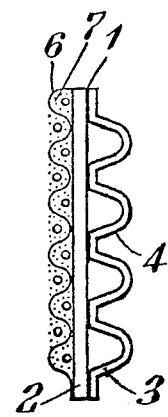
FIGURE 2 is an edge view in section of a screen-covered panel wall wherein the screen retains an adsorbent. Thus.
Figure 3:
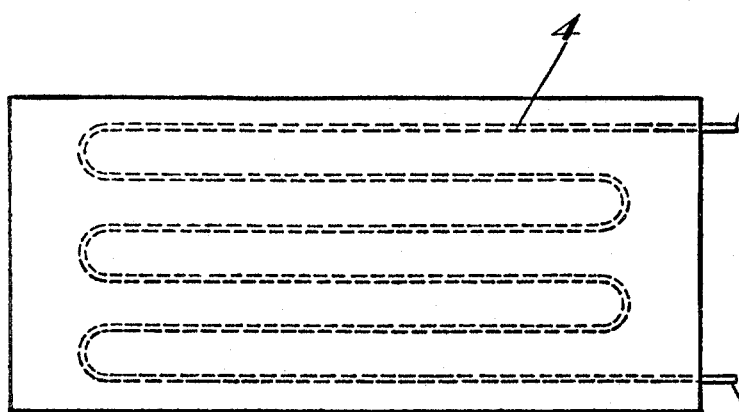
FIGURE 3 is a front view of a panel which can be employed in producing a coated panel of this invention.
Figure 4:
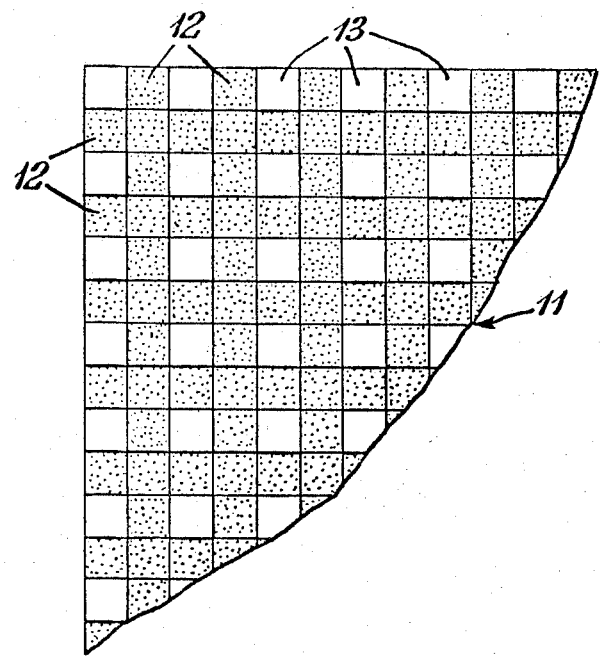
FIGURE 4 is a front view of another panel which can be employed in producing a coated panel of this invention.
Figure 5:
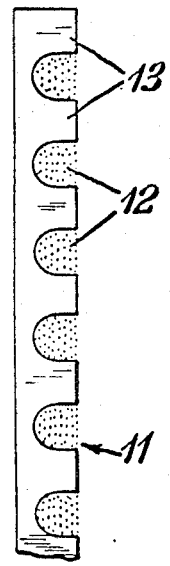
FIGURE 5 is an edge view in section of a portion of the panel of FIGURE 4.

The adsorbent coated refrigerated surfaces of the present invention are preferably constructed in the form of panels. FIGURE 1 shows an exemplary panel which may consist of a metallic plate coated on one or both sides with adsorbent material or alternately may consist of an adsorbent impregnated screen. The panel is provided at regular intervals with pipes or channels carrying a refrigerant. FIGURE 2 shows another exemplary panel in which an adsorbent impregnated screen is positioned in good thermal contact with a surface refrigerated by a refrigerant passing through a corrugated structure positioned against the opposite wall of the refrigerated surface. FIGURE 3 shows an exemplary panel with a serpentine coiled refrigerant tube affixed to the back of the panel. FIGURES 4 and 5 show an exemplary panel which comprises a cross-milled refrigerated surface with the adsorbent material bonded in the cross-milled grooves.

It has been unexpectely discovered that the effectiveness of an adsorbent material when used in a cryosorption apparatus greatly decreases if gases are permitted to condense and freeze on the adsorbent surface rather than adsorbed by the material. Therefore, in any cryosorption apparatus the cryosorption panels of this invention must be either shielded from gases which would condense and freeze on the adsorbent surface or maintained at a temperature such that gases will not condense and freeze thereon.

Furthermore, since the adsorbent characteristics of adsorbent materials are very temperature dependent it is necessary that the cryosorption panels of this invention be optically shielded from thermal radiation.

FIGURE 6 exemplifies three cryosorption units designed for hydrogen pumping to achieve pressures as low as about $10^{-10}$ torr, which protect the adsorbent panels from condensed gases and thermal radiation. Consistent with refrigeration requirements a single 20° K. adsorbent panel or array of panels have been found suitable for hydrogen pumping. The 20° K. surfaces will be surrounded by baffles cooled to about 100° K. These baffles permit the passage of gas molecules but intercept radiation. In addition to shielding from thermal radiation, condensable gases such as oxygen and nitrogen must be prevented from freezing on the adsorbent surface. Consequently a shield refrigerated to 20° K. will be placed between the adsorbent surface and the 100° K. baffles.

The 20° K. shields serve as cryopumping (condensation) surfaces for the removal of condensables. In all cases the 100° K. and 20° K. baffles and shields are shown to be of the chevron type. (The distinction between baffles and shields is arbitrary. For the sake of convenience, the 100° K. surfaces which intercept radiation and condensables, such as water, are referred to as baffles. The 20° K. surfaces which intercept and condense gases such as nitrogen and oxygen are referred to as shields.) Referring again to FIGURE 6, integrated configurations of 100° K. baffles, 20° K. shields, and adsorbent panels are called pumping units and are referred to by the abbreviations, SP, PP, and BPP which are defined in FIGURE 6. The cryosorption panels of the BPP and PP unit, which are arranged in a series of closely spaced cryosorption arrays with adsorbent coated on both sides of the panels, are a more preferable construction than the single cryosorption panel in the SP unit. The cryosorption pumping speed of such an array expressed on a unit open area basis (the open area of the array being the total area available for molecules to enter the volume between the panels) will be larger than the unit area pumping of a single cryosorption panel because molecules entering the array have the opportunity of undergoing multiple contacts with the adsorbent surfaces before they leave the array thereby increasing the "capture coefficent" of the panels. The radiation shield and the cryopumping arrays for removing gases that condense at 20° K. are shown diagrammatically as chevron baffles but other geometries may be used as required, e.g. louvers.

If a system similar to those shown in FIGURE 6 were to be designed for cryopumping helium at 4.2° K. to achieve still lower pressures, the 20° K. cryosorption panel of FIGURE 6 would be changed to a 4.2° K. cryosorption panel and a 4.2° K. shield would be interposed between the 20° K. shield and the 4.2° K. cryosorption panel to condense hydrogen and neon. In such an instance the chevron baffles of the 4.2° K. shield array would be spaced quite tightly together to insure that all gases other than helium will be "filtered out" sufficiently so as not to contaminate the helium 4.2° K. cryosorption panel.

As an example of the application of cryosorption units such as disclosed in FIGURE 6, consider the evacuation of a closed chamber originally having a 1 atm. normal dry air composition as follows:

| Air Component | Composition (Vol. Percent) | Freezing Point of principal components (° K.) |
|---|---|---|
| $N_2$ | 78.09 | 63 |
| $O_2$ | 20.95 | 54.5 |
| Argon | 0.932 | 84 |
| $CO_2$ | 0.03 | |
| Neon | $1.8 \times 10^{-3}$ | 24.5 |
| He | $5.0 \times 10^{-4}$ | |
| Krypton | $1.1 \times 10^{-4}$ | |
| $H_2$ | $0.5 \times 10^{-4}$ | 13.9 |
| Xenon | $0.08 \times 10^{-4}$ | |

Assume that the chamber is first evacuated to 1 micron by any means, such as a diffusion pump or a mechanical pump for example. The 100° K. baffles are then cooled to condensing and freezing out $CO_2$. According to Boyles law, the pressure of the remaining components at 100° K. would be about $3 \times 10^{-3}$ torr. Next the 20° K. shields are cooled, condensing and freezing out all remaining condensables but helium, hydrogen and neon. The pressure of the remaining components at 20° K. would be about $1 \times 10^{-9}$ torr, due principally to the partial pressure of neon inasmuch as the partial pressures of helium and hydrogen are orders of magnitude less. Finally, the 20° K. cryosorption panels are placed in operation by cooling to 20° K. and hydrogen is adsorbed. The pressure of the chamber would then be about $2.5 \times 10^{-10}$ torr, which is low enough to simulate outer space. It must be realized, of course, that the foregoing example is idealized because of the assumption of a closed chamber. Any chamber will not be absolutely tight so there will be some minute air leakage into the chamber. Furthermore, a relatively large amount of hydrogen will unavoidably evolve from the metal walls of the chamber at low pressures. Notwithstanding the idealized nature of this example, however, the example is indicative of the results obtainable by the present invention inasmuch as the capacity of the cryosorption panels need only be increased sufficiently to handle the larger-than-theoretical gas loads.

From the data on freezing temperatures in the foregoing table, it is apparent that any cryosorption system designed to achieve a low pressure by removing the principal components of air, oxygen and nitrogen, i.e. on the order of $10^{-3}$ torr or less corresponding to temperatures of 20° K. or less, must substantially prevent these gases from condensing and freezing on the cryosorption panels to prevent contamination thereof. One possible way to accomplish this result would be to provide a cryosorption panel refrigerated to about 77° K. to adsorb these gases rather than condense and freeze them on 20° K. shields. Likewise, in a helium pumping system described in a preceding paragraph in reference to FIGURE 6, rather than employing a 4.2° K. shield to condense and freeze out hydrogen, a 20° K. cryosorption panel array could be provided to adsorb the hydrogen.

The temperatures, baffles, shields and panels used in the foregoing examples are merely exemplary and were chosen because they are easily achievable with liquefied gas refrigeration systems. For example, the 20° K. shields and panels can be refrigerated with liquid hydrogen which has an atmospheric boiling point of about 20° K., a 77° K. shield can be refrigerated by liquid nitrogen, and the 4.2° K. shields and panels can be refrigerated by liquid helium. Other temperatures could be employed, however. For example, gaseous helium at about 15° K. could be substituted for 20° K. liquid hydrogen. The particular choice of the temperatures at which the various elements of a pumping unit will usually be determined partly by economic considerations such as the efficient use of the liquefied gas refrigerants as well as by the desired results to be achieved by the various elements.

Units such as shown in FIGURE 6 are adaptable to construction within the space to be evacuated, as might be required for space simulation chamber, or in a separate apparatus to be connected in gaseous communication with the chamber that is to be evacuated.

The panel walls in the coated panels of this invention are adapted for rapid heating and cooling. This is readily and preferably achieved by providing channels within the panel wall or by attaching cooling conduits to the panel wall. Heat transfer media can be passed through such channels or cooling conduits to heat or cool the panel wall as desired. Such heat transfer media include refrigerated brine, liquid nitrogen, liquid hydrogen, liquid helium, cold gaseous nitrogen, cold gaseous hydrogen, and cold gaseous helium in those cases where it is desired to cool the panel wall.

When it is desired to heat the panel wall, heat transfer media such as hot water, hot organic liquids (e.g. Dowtherm), or hot gases (e.g., hot air, hydrogen, nitrogen, helium, or steam) can be employed. Heating and cooling the panel wall results in a corresponding heating or cooling of the adsorbent since the adsorbent is in good thermal contact with the panel wall. Heating serves to release adsorbed gases from the adsorbent, while cooling serves to increase the gas adsorbent properties of the adsorbent. Good heat transfer between the panel wall and the adsorbent is achieved by bonding the adsorbent to the wall in such a manner that no voids separate the adsorbent from the wall surface.

When warming units such as shown in FIGURE 6 after evacuating a chamber, it might be preferable that they be warmed in the reverse order to the order in which they were cooled. Warming in reverse order, i.e., warming the cryosorption panel first, will prevent contamination of the adsorbent material by $CO_2$ or water which would otherwise occur if other elements than the cryosorption panels were first warmed and the gases released therefrom. It is especially important that $CO_2$, and water if present, be prevented from contaminating a cryosorption panel inasmuch as reactivation of the adsorbent will be more complicated if the adsorbent is so contaminated.

A panel suitable for use in the coated panels of this invention can be composed of a single sheet or of a plurality of sheets suitably affixed together (e.g., by bolts or by welding or by brazing, or by soldering). Provided good heat transfer to the adsorbent and good bonding of the adsorbent can be achieved, the particular materials of which the panel walls are constructed are not critical. However, because of their excellent properties, metals— and particularly stainless steel, aluminum, and copper— are preferably the principal or only materials present in the panel walls. The particular configuration of the panel walls is not narrowly critical, and can be selected in view of the particular application for which the wall is intended. Thus, the panel walls can be curved or flat, and regularly or irregularly shaped.

FIGURE 2 is an edge view in section of a panel wall suitable for use in producing a coated wall of this invention. The panel wall 1 comprises a flat sheet 2 welded to a corrugated sheet 3. The corrugations 4 provide channels for the flow of a heat transfer medium through the panel wall. A screen 6 is bonded to the outer surface of sheet 2 and contains an adsorbent material 7 bonded thereto.

FIGURE 3 shows how the channels 4 may be joined at the end of the panel to provide a continuous passage for the refrigerant through the wall. Conduits 5 and 6 provide means for the flow of a heat transfer medium into and out of the channels 4.

FIGURE 4 depicts a portion of a metal plate 11, the surface of which has been milled horizontally and vertically to provide parallel horizontal and vertical grooves 12 which may be $\frac{1}{16}$ inch deep, $\frac{1}{16}$ inch wide, and spaced $\frac{1}{16}$ inch apart. As a result of this milling operation, the surface of the metal plate 11 is studded with small rectangular raised portions 13. These raised portions approximate cubes having $\frac{1}{16}$ inch sides. The grooves between the raised portions were filled with an adsorbent up to the level of the raised portions.

FIGURE 5 is a side view of the coated panel of FIGURE 4, showing the raised portions 13 produced on the surface of the metal plate by milling. FIGURE 5 also shows the adsorbent coated on the panel in the grooves 12 between the raised portions 13.

A coated panel of this invention of the type depicted by FIGURE 2 was prepared as follows:

(1) The surface of the panel wall to which the adsorbent was to be bonded was cleaned with a commercially available pickling solution. Both the flat sheet 2 and the corrugated sheet 3 were composed of stainless steel having a thickness of $\frac{1}{16}$ inch. The corrugations were $\frac{3}{8}$ inch high and $1\frac{1}{4}$ inch wide at the base. A stainless steel screen of 16 mesh having a wire diameter of about 10/1000 inch was similarly cleaned with a standard pickling solution.

(2) The panel wall and the screen were further cleaned by washing with ethanol, contacting them with steam, and then rinsing them with distilled water.

(3) Excess moisture was removed from the panel wall and the screen by passing dry nitrogen gas over them.

(4) Thin strips of a silver-copper brazing alloy were laid on the surface of the panel wall.

(5) The wire screen was placed over the sheets of the brazing alloy, and the entire assembly was clamped together.

(6) The entire assembly was placed in an oven and was heated to 1300° F. to melt the brazing alloy.

(7) The assembly was removed from the oven and washed with hot water and acid.

(8) The assembly was further cleaned by passing steam over the surface, and then distilled water.

(9) Excess surface moisture was removed from the assembly by passing dry nitrogen gas over it.

10) An aqueous slurry containing a mixture of 80 weight-percent calcium zeolite A and 20 weight-percent kaolin binder was applied to the surface of the panel wall coated with the screen.

(11) The entire assembly was again placed in an oven in which was maintained an atmosphere of dry nitrogen gas. The temperature of the oven was raised slowly to approximately 600° C. The oven was maintained at 600° C. for two hours, and then the assembly was cooled to room temperature by passing cooled dry nitrogen gas over the assembly. The thickness of the coating of the zeolitic molecular sieve-kaolin mixture on the panel wall was from $1/64$ to $1/32$ inch.

The following procedure illustrates the production of a panel similar to that depicted in FIGURES 4 and 5.

An aluminum plate was cross-milled to provide square pegs ($1/16$ inch x $1/16$ inch x $1/16$ inch) spaced $1/16$ inch from each other, and cleaned in the same manner as the panels of FIGURES 2 and 3. A molecular sieve slurry identical to that applied to the panels of FIGURES 2 and 3 was applied to the cross-milled plate and allowed to dry at ambient temperatures for 14 hours. The panel was heated to 200° C. in an air atmosphere and allowed to cool to ambient temperatures. It was then placed in a furnace in which a dry nitrogen gas purge was maintained and heated at 100° C. for 1 hour and then the temperature was brought up to 590° C. for 2 hours. A bond was established between the molecular sieve material and the aluminum surface which withstood repeated cycling between 120° C. and —253° C. (20° K.).

FIGURE 7 depicts a shielded cryosorption unit. Chevron baffles 20 serve as cryopumping surfaces for condensible as well as radiation shields from the cryosorption panel 22. The chevron baffles 20 comprise aluminum plates bent at a 45° angle mounted on a frame 24. The chevron baffles 20 are cooled and warmed through tubes which are brazed or welded to the chevrons at the bends. These tubes are manifolded at the ends to end tubes 26. The chevrons are mounted on each side of the cryosorption panel 22 and the ends, top, and bottom of the array are closed with aluminum plates (not shown) so that gases only enter the unit from the sides. This construction is similar to the SP unit of FIGURE 6.

FIGURE 8 shows an alternate cryosorption panel configuration which may be inserted between the chevron baffles of FIGURE 7. The cryosorption panels comprise an array 28 of a series of parallel panels manifolded to a cooling and warming means. This construction is similar to the PP unit of FIGURE 6. If the condensible gas load is small, the structure of FIGURE 8 might not require condensation baffles inasmuch as the outer portions of the panels would remove many of the condensibles, leaving the inner portions active for cryosorption of the non-condensibles.

What is claimed is:

1. A cryosorption system which comprises at least one adsorbent coated cryosorption panel comprising a wall member constructed of thermally conductive metal, a thin layer of adsorbent material bonded in good thermal and structural contact with said wall member, and means for providing cooling and warming of said wall member; at least one condensation baffle array positioned around the cryosorption panel to shield such panel from condensible gases; at least one radiation shield positioned to optically shield said cryosorption panel from thermal radiation; and means for cooling and warming the condensation baffle array and the radiation shield.

2. A cryosorption system according to claim 1 wherein a plurality of cryosorption panels are provided in a blocked parallel panel configuration.

3. A cryosorption system according to claim 1 wherein a plurality of cryosorption panels are provided to parallel panel configuration.

4. Process for creating a vacuum in a closed chamber containing a mixture of gases, some of which condense and freeze at a temperature at which the remainder are uncondensed, which comprises providing in gaseous communication with said closed chamber a cryosorption panel baffled by a condensation array and optically shielded by a radiation shield, said cryosorption panel, condensation array and radiation shield each having cooling means; and sequentially cooling first the radiation shield to a predetermined low temperature, but not sufficiently low to condense any of the gases of the mixture, secondly cooling the condensation array to a temperature lower than that of said radiation shield and sufficiently low to condense and freeze the condensible gases of the mixture, and thirdly cooling the cryosorption panel to a temperature sufficiently low to adsorb and hold in the adsorbed state the remaining gases of the mixture whereby the number of gas molecules in the chamber in free molecular motion is substantially lessened.

5. A process according to claim 4 wherein the radiation shield is firstly cooled to a temperature at least as low as about 100° K., the condensation array is secondly cooled to a temperature of about 20° K., and the cryosorption panel is cooled to a temperature at least as low as about 20° K.

References Cited by the Examiner

UNITED STATES PATENTS

| | | | |
|---|---|---|---|
| 2,038,071 | 4/1936 | Wilhelm | 55—316 X |
| 2,762,449 | 9/1956 | Sweeney | 55—27 |
| 2,842,223 | 7/1958 | Zall | 55—387 |
| 2,904,665 | 9/1959 | Gordon. | |
| 2,973,327 | 2/1961 | Mitchell et al. | 252—449 |
| 3,067,560 | 12/1962 | Parker | 55—387 X |
| 3,116,764 | 1/1964 | Jepsen et al. | |
| 3,148,966 | 9/1964 | Kitchen. | |
| 3,181,231 | 5/1965 | Breck | 23—111 X |

FOREIGN PATENTS

| | | |
|---|---|---|
| 610,910 | 3/1935 | Germany. |
| 51,955 | 2/1942 | Netherlands. |

REUBEN FRIEDMAN, *Primary Examiner.*

J. ADEE, *Assistant Examiner.*